(12) United States Patent
Rolt

(10) Patent No.: US 7,770,377 B2
(45) Date of Patent: Aug. 10, 2010

(54) TURBOFAN ARRANGEMENT

(75) Inventor: Andrew M. Rolt, Derby (GB)

(73) Assignee: Rolls-Royce plc, London (GB)

( * ) Notice: Subject to any disclaimer, the term of this patent is extended or adjusted under 35 U.S.C. 154(b) by 1061 days.

(21) Appl. No.: 11/395,152

(22) Filed: Apr. 3, 2006

(65) Prior Publication Data

US 2007/0051091 A1    Mar. 8, 2007

Related U.S. Application Data

(63) Continuation-in-part of application No. 10/809,467, filed on Mar. 26, 2004, now Pat. No. 7,107,756.

(30) Foreign Application Priority Data

Apr. 10, 2003    (GB) ................................ 0308244.3

(51) Int. Cl.
F02K 3/02    (2006.01)
F02C 7/10    (2006.01)

(52) U.S. Cl. ..................... 60/226.1; 60/266; 60/39.511

(58) Field of Classification Search ................. 60/224, 60/226.1, 266, 267, 39.5, 39.511
See application file for complete search history.

(56) References Cited

U.S. PATENT DOCUMENTS

| | | | | |
|---|---|---|---|---|
| 2,820,599 A | * | 1/1958 | Ackeret et al. ................ 60/266 |
| 2,930,190 A | * | 3/1960 | Rogers ..................... 60/39.511 |
| 3,318,095 A | * | 5/1967 | Snell .......................... 60/226.1 |
| 3,368,352 A | * | 2/1968 | Hewson ....................... 60/224 |
| 3,387,457 A | * | 6/1968 | Garraway .................... 60/224 |
| 3,659,422 A | | 5/1972 | Hope |
| 4,222,233 A | | 9/1980 | Johnson |
| 4,254,619 A | | 3/1981 | Giffin, III |
| 4,679,394 A | | 7/1987 | Taylor |
| 4,827,712 A | | 5/1989 | Coplin |
| 5,975,841 A | * | 11/1999 | Lindemuth et al. .......... 415/115 |
| 6,260,800 B1 | * | 7/2001 | Snell .......................... 60/226.3 |
| 6,845,606 B2 | | 1/2005 | Franchet |
| 2002/0020168 A1 | * | 2/2002 | Boeck ......................... 60/266 |

FOREIGN PATENT DOCUMENTS

GB    1291235 SP    10/1972

* cited by examiner

*Primary Examiner*—Ted Kim
(74) *Attorney, Agent, or Firm*—Jeffrey S. Melcher; Manelli Denison & Selter PLLC

(57) ABSTRACT

A bypass turbofan engine comprises a first propulsion system and a second propulsion system. The first propulsion system comprises a first fan rotor, a core engine, a first low pressure turbine and a first fan shaft drivingly connecting the first turbine and the first fan rotor. The second propulsion system comprises a second fan shaft drivingly connecting to a second fan rotor and the first propulsion system and arranged so that the first and second shafts are not coaxial with one another.

30 Claims, 9 Drawing Sheets

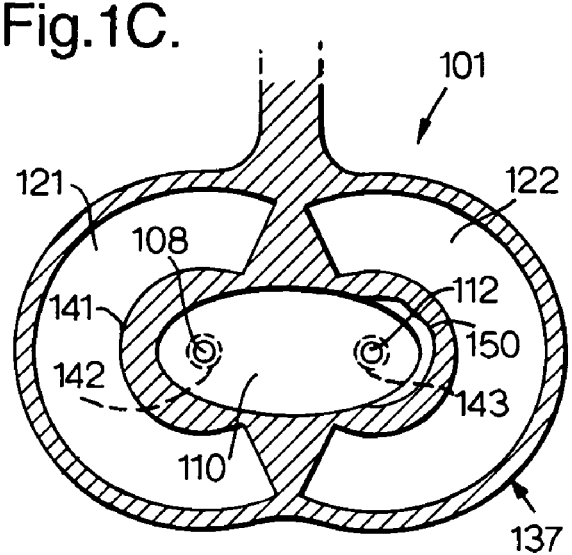
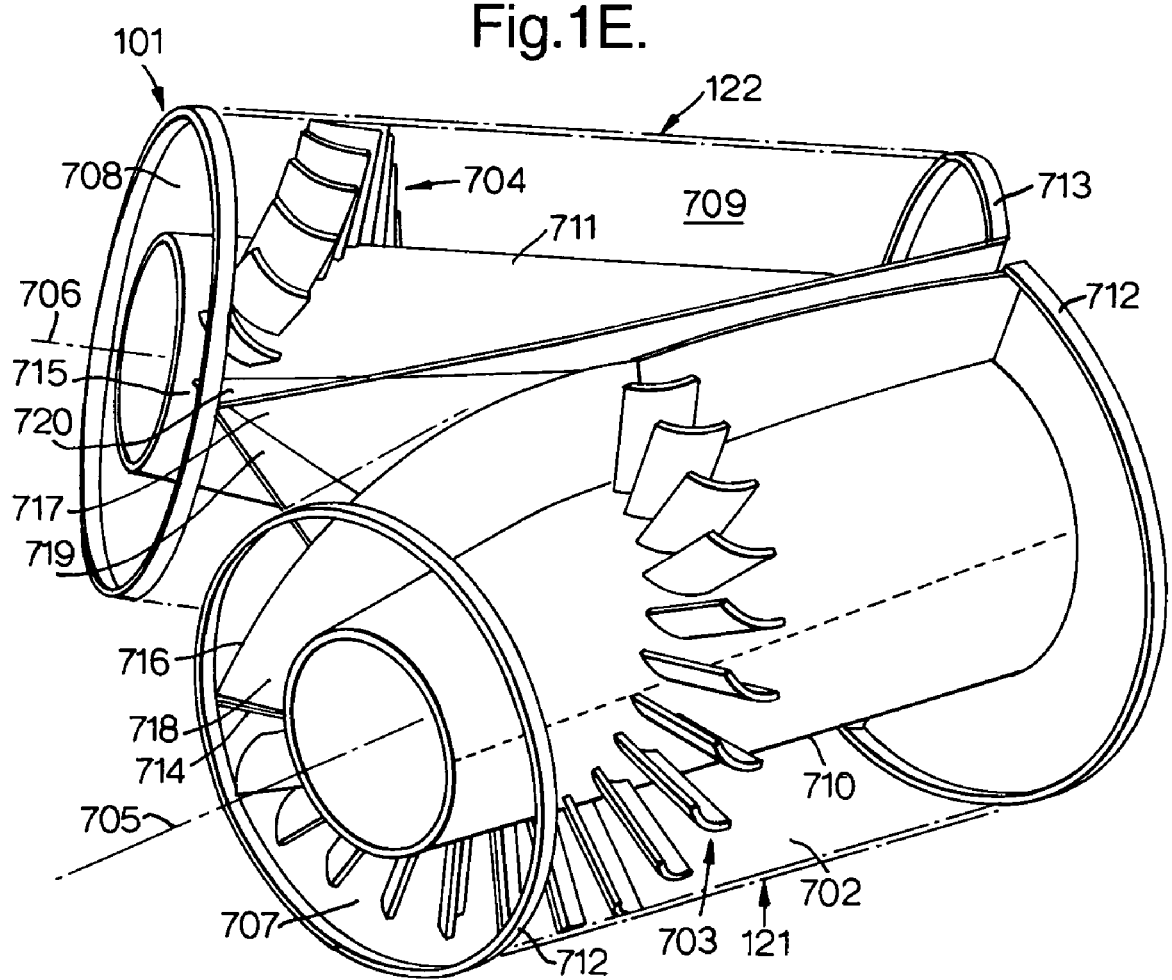

TURBOFAN ARRANGEMENT

This is a Continuation-In-Part of National application Ser. No. 10/809,467 filed Mar. 26, 2004, now U.S. Pat. No. 7,107,756. This application claims foreign priority under 35 U.S.C. 119 from Great Britain patent application serial No. 0308244.3, filed 10 Apr. 2003.

BACKGROUND OF THE INVENTION

The present invention relates to an arrangement for an aerospace turbofan engine.

As the specific thrust of a conventional turbofan engine is reduced to improve propulsive efficiency, or to reduce fan and jet noise, its bypass ratio increases, the fan rotational speed reduces and the fan shaft torque increases, requiring a larger diameter shaft. The increased fan shaft diameter increases the minimum bore diameters of the core components, requiring them to be designed for lower rotational speeds that, in turn, increase parts counts, cost and weight. The increased bypass ratio also results in a mismatch between the hub radius of the fan and the hub radius of the subsequent compressor stages, increasing duct lengths and duct losses between compressors. The higher bypass ratio also requires an increased number of turbine stages to drive the fan, the maximum turbine radius being limited by installation constraints. Very high bypass ratio engines are prohibitively heavy, and when installed under-wing on a conventional low wing aircraft they require an increase in aircraft undercarriage length which adds further cost and weight penalties to the aircraft. The larger size engines are also more difficult to transport to and from the aircraft.

In order to avoid an excessive number of turbine stages and their associated cost, mass and complexity, the generally proposed solution for very high bypass ratio engines is to incorporate a gearbox between the fan and the turbine so that the turbine rotational speed can be increased to increase work per stage and reduce the total number of turbine stages. However this arrangement adds the cost, mass, complexity and potential unreliability of incorporating a high power gearbox, it is unproven for large engines, and is unattractive to aircraft operators. Problems still remain with the mismatch in compressor hub radii and with the installation of the engine on the aircraft.

Increasing the number of engines on an airframe by installing two or three smaller engines side by side in a common nacelle on each under-wing pylon is a well-known arrangement. This would enable lower specific thrust engines to be fitted without an increase in undercarriage length or a reduction in ground clearance or a reduction in the 'gully depth' (the distance between the wing and the nacelle) that is needed to minimise interference drag. Small engines are however less efficient and less cost effective than large engines and this arrangement does not solve the problem that each engine needs either a very large number of turbine stages or a geared fan.

Aircraft engine configurations where a single engine has more than one fan are also known.

Aircraft engines having two fans with parallel flows have been proposed with the fans arranged in series on the same shaft and driven by the same turbine. These so called tandem fan engine arrangements can increase the total mass flow for a given frontal area and reduce the total number of turbine stages required for a given overall bypass ratio. However, the convoluted exit nozzles for the first fan and the bifurcated intakes for the second fan add significantly to the installation losses for a low specific thrust version of such an engine. In a conventional under-wing installation the extra length of a tandem fan engine projecting forwards from under the wing results in higher wing bending moments and a significant weight penalty for the wing and the pylon supporting the engine. The forward extension of the engine also interferes with the space available for loading and unloading the aircraft. Variable specific thrust versions of such engines may be better suited to supersonic aircraft where the engine nacelles can be integrated with a delta wing.

The use of separate lift fans or propellers driven by shafts and gears through clutches is another known arrangement and multiple low specific thrust fans have also been proposed mounted around the rear fuselage of an aircraft and driven by gears and shafts from a smaller number of gas generators driving power turbines buried within the fuselage. These arrangements have the disadvantage of needing complex geared drive systems.

It has also been proposed to drive a low specific thrust fan by turbine blades mounted on the periphery of the fan rotor assembly. Such tip turbines can be fed from gas generators that are not coaxial with the fans. However, tip turbines are not easy to design and manufacture, and sealing them is particularly difficult. Gas leakages result in poor performance, making such arrangements unattractive.

Remote fans driven by compressor bleed air and separate combustors and turbines have also been proposed. Such engines need additional combustors that add to the complexity and potential unreliability of the engines, making them unattractive. The fans would also need to be geared to avoid an excessive number of turbine stages in a low specific thrust power plant.

A turbojet engine with an auxiliary pair of parallel flow fans arranged on either side of it and driven by parallel flow turbines is also known. Such a multiple fan aero engine arrangement was first described in GB1,110,113. This engine has a turbojet core with its own intake, and two auxiliary parallel flow fans with their own separate intakes. An auxiliary turbine directly drives each of the auxiliary fans. The core exhaust gasses can be supplied to the two parallel flow auxiliary turbines by means of a bifurcated duct. This engine, mounted with the fans side by side in an under-wing installation, overcomes the problem with ground clearance for low specific thrust engines. The disadvantages of this multiple fan engine arrangement, for a low specific thrust engine, are that a very large number of turbine stages are required; the core intake is not protected from ingestion of foreign objects by an upstream fan; the core needs its own intake with its additional pressure losses; and the core compressors do not benefit from the supercharging of the air through a fan.

None of these previously described designs is entirely satisfactory for a very low specific thrust engine mounted in an under-wing installation.

SUMMARY OF THE INVENTION

The present invention improves the design of known multiple fan engines, avoiding or greatly reducing all the previously described disadvantages of the aforementioned engine arrangements. Relative to a conventional engine of a given overall bypass ratio it can halve the total number of turbine stages required to drive the fans, without increasing turbine mean diameter or stage loading or using a gearbox.

Therefore it is an object of the present invention to provide a bypass turbofan engine comprises a first propulsion system and a second propulsion system, the first propulsion system comprises a first fan rotor, a core engine, a first low pressure turbine and a first fan shaft drivingly connecting the first turbine and the first fan rotor, the second propulsion system comprises a second fan rotor drivingly connected to a second low pressure turbine via a second fan shaft; in use a fluid drivingly flows through the first turbine then the second turbine; wherein the first and second shafts are not coaxial with one another; and wherein the engine comprises a heat exchanger positioned between the first low pressure turbine and the second low pressure turbine.

Preferably, the core engine comprises, in flow sequence, a core compressor, a combustor and a core turbine the core compressor is drivingly connected to the core turbine via the first fan shaft or a core shaft which is coaxial with the first fan shaft.

Preferably, the engine is arranged so that the airflow from the core compressor flows through the heat exchanger and into the combustor, the fluid flow from the combustor drivingly flows through the core turbine, the first turbine and the heat exchanger thereby increasing the heat of the airflow from the core compressor to the combustor.

Preferably, a first valve is located upstream and adjacent the heat exchanger and a second valve is located between the core compressor and the combustor the valves are operable to divert the compressor flow around the heat exchanger so that, in use, a desirable increase in engine power is achieved.

Alternatively, the engine comprises a third propulsion system, the third propulsion system comprises a third fan drivingly connected to a third turbine via a third shaft, the third turbine is arranged substantially in flow sequence with the first and second turbines and the third shaft is not coaxial with a shaft of another fan system, characterised in that the turbines are arranged substantially in flow sequence in order first, second and third turbines.

Alternatively, the first propulsion system comprises a core flow booster compressor is provided between the first fan rotor and the core engine and is drivingly connected to the first turbine by the first shaft.

Alternatively, the second fan system further comprises a second compressor, a fourth turbine and a fourth shaft, the fourth shaft is coaxial with the second shaft and drivingly connects the second compressor and the fourth turbine. Here, fluid flow from the core engine flows drivingly through the fourth turbine of the second fan system.

Additionally, the engine further comprises a first chamber and a second heat exchanger, the first chamber is located between and is in fluid communication with the first fan and the core compressor the second heat exchanger is adjacent the first chamber and is arranged to receive fluid from the second compressor through the heat exchanger, cooling fluid from the first fan passes through the heat exchanger to cool the fluid from the second compressor so that the core compressor compresses the fluid more efficiently. In this embodiment, the second heat exchanger comprises valves, operable to open and close the second heat exchanger to fluid flows from the first fan and the second compressor so that, in use, a desirable increase in engine power is achieved when the valves are closed and the engine is more efficient when the valves are open. Further, the fluid passing through the heat exchanger from the first fan is ducted to and mixed with a fluid flow exhausting from the turbine and upstream of the final nozzle.

Preferably, the valves are operable to regulate the flow of fluid through the second heat exchanger to optimize efficiency at a desired engine output.

Alternatively, the non-coaxial first and second shafts are angled between 0-40 degrees relative to one another so that the first and second shafts converge in the downstream direction.

Alternatively, the rotational speeds of at least two fans are synchronised over at least part of the fans' speed range by means of at least one variable capacity turbine.

Alternatively, the rotational speeds of at least two fans are synchronised over at least part of the fans' speed range by means of a variable area core flow nozzle.

Alternatively, the rotational speeds of at least two fans can be synchronised over at least part of the fans' speed range by means of at least one variable area bypass flow nozzle.

Alternatively, the rotational speeds of at least two fans can be synchronised over at least part of the fans' speed range by means for bleeding air from at least one bypass duct. The means of bleeding air from at least one bypass duct comprises at least one variable area auxiliary bypass flow nozzle.

Alternatively, the rotational speeds of at least two fans can be synchronised over at least part of the fans' speed range by means of a variable area mixer, the variable area mixer is disposed upstream of the core nozzle and in operation mixes part of the bypass air from at least one of the fans with the exhaust flow from the final downstream turbine.

Alternatively, the rotational speeds of at least two fans are synchronised over at least part of the speed range of the fans by means of at least one set of variable pitch vanes. The at least one set of variable pitch vanes is disposed upstream of the final downstream turbine.

Alternatively, the second fan system is also driven by the first fan system by means of a gear-train configured to work in operative association with at least two shafts. Preferably, the rotational speeds of the at least two fan rotors are synchronised by the gear-train. Preferably, the lay-shaft is drivingly connected at one end to the low power gear-train via an idler gear, the at least one lay-shaft is drivingly connected at its distal end to an accessory drive, which is any one from the group comprising an electrical generator or a compressor.

Preferably, the engine comprises a nacelle defining a bypass duct, the bypass duct comprises an inlet and a bypass exhaust nozzle, the bypass duct substantially surrounds and extends downstream of a fan rotor and transitions from a substantially circular cross-section to a part-ring shaped cross-section at its exhaust nozzle.

Preferably, the part-ring shaped cross-section is in the form of any one from the group comprising a lens, a horseshoe, a semicircle, a semi-elliptical or a super-ellipse shaped engine exhaust nozzle.

Alternatively, the bypass duct is partly defined by pairs of bypass duct splitter walls that diverge generally in the axial downstream direction from a common leading edge, the divergence of the splitter walls defines the transition of the bypass duct from the substantially circular cross-section to an arcuate cross-section at its exhaust nozzle. Preferably, the bypass duct comprises a set of axially staggered vanes disposed between the divergent splitter walls such that swirling air flow from the fan rotors along the splitter walls and through the bypass duct substantially retains the swirl from the fan rotors until the swirl is reduced by the set of stator vanes.

BRIEF DESCRIPTION OF THE DRAWINGS

The present invention will be more fully described by way of example with reference to the accompanying drawings in which:

FIG. 1C is a schematic transverse section view on C-C of the first embodiment shown in FIG. 1.

FIG. 1E is a schematic cut away view of the first embodiment shown in FIG. 1.

FIGS. 4a and 4b are schematic front elevations of fan arrangements of a turbofan engine in accordance with the present invention.

DETAILED DESCRIPTION OF THE INVENTION

Figure 1:
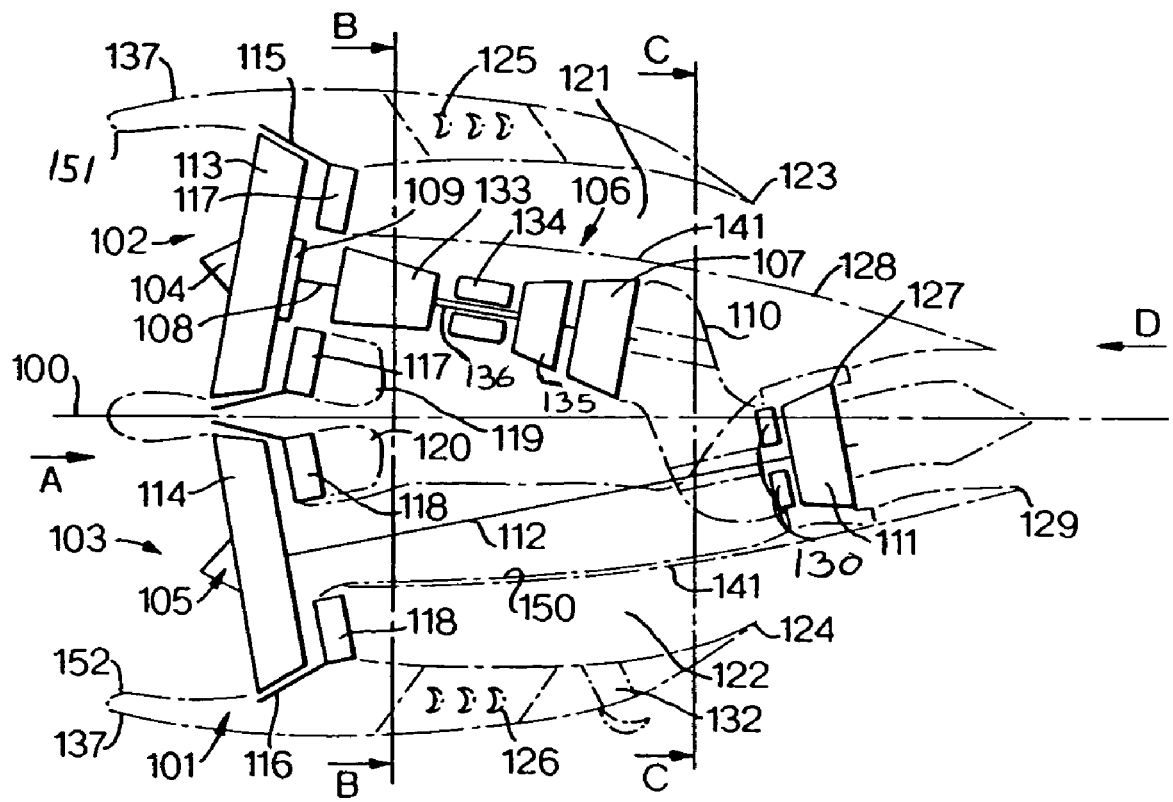
FIG. 1 is a schematic plan view of a first embodiment of a turbofan engine in accordance with the present invention.

With reference to FIG. 1, the first embodiment of the turbofan engine 101 is a low specific thrust engine 101 configured with first and second propulsion systems 102, 103 comprising first and second fan systems 104 and 105 respectively that are disposed equi-angularly about a centre-line 100. The first and second fan systems 104 and 105 each comprise a first and second fan rotor 113, 114 respectively and are mounted generally side by side, when installed on an aircraft wing that is generally horizontal, in an integrated nacelle 137. The nacelle 137 comprises two intake systems 151 and 152. The fan systems 104 and 105, in use, are co-rotating to maximise parts commonality. Alternatively, the fan systems 104 and 105 are arranged to contra-rotate, thereby minimising gyro-couples and maximising turbine efficiencies. The first fan system 104 has a conventional bypass ratio $\eta_1$ and is followed, in the downstream flow direction, by a conventional core engine or gas generator 106 coaxial to the first fan system 104, and by a first low pressure turbine 107, which drives the first fan 113 directly through the first fan shaft 108. The first low pressure turbine 107 comprises a "small number of rotor stages" which is defined hereinafter. These rotor stages are interposed by stator stages in conventional fashion.

The core engine 106 comprises, in downstream axial flow sequence a core compressor 133, a combustor 134 and a core turbine 135. The core compressor 133 is drivingly connected to the core turbine 135 via a core shaft 136. The core shaft 136 is coaxial with and surrounds part of first fan shaft or spool 108. Alternatively, the core engine 106 comprises a single spool 108 common to the low-pressure turbine 107 and first fan rotor 113.

Preferably, although not essentially, the first fan system 104 may be fitted with a core flow booster compressor 109 driven by the same low-pressure turbine 107.

The exhaust gasses from the first low pressure turbine 107 are discharged into a short duct 110 which displaces the flow away from an axis (defined by the centre-line through the first fan shaft 108) of the first fan system 104. The flow then enters a second low-pressure turbine 111 that has a direct second shaft 112 drive to the second fan system 105. If the fans each have the same mass flow, the overall bypass ratio $\eta$ is increased to $(2\eta_1+1)$. For economy in manufacturing, the two fan rotors 113 and 114, and their static casings 115 and 116 and their outlet guide vanes 117 and 118 may be identical designs.

In order to minimise the length of the inter-turbine duct 110, the two fan systems 104, 105 are arranged close together with their first and second fan shafts 108 and 112 angled towards each other in the downstream direction. In FIG. 1, the axes of the fan shafts 108, 122 lie in the same plane, that being generally in the plane of the paper, but at least one axes may be further angled into or out of the plane of the paper, but nevertheless such that they converge in the downstream direction. Alternatively, the inter-turbine duct 110 may be divided into two or more generally parallel flow ducts so that the engine first and second fan shafts 108 and 112 are not directly exposed to the hot turbine gasses. Having two or more generally parallel flow ducts enables the inter-turbine duct 110 to be configured with tighter bends and may be further configured to vary in cross-sectional flow area.

As described above, the bypass turbofan engine 101 comprising the essential features; the first propulsion system 102 and the second propulsion system 103; the first propulsion system 102 itself comprises the first fan rotor 113, a core engine 106, a first low pressure turbine 107 and the first fan shaft 108. The first fan shaft 108 is drivingly connected to the first turbine 107 and the first fan rotor 113. The second propulsion system 103 comprises the second fan shaft 112, which is drivingly connected to the second fan rotor 114. Importantly, the present invention is realised where the second fan system 105 is driven by the first propulsion system 102 and the first and second shafts 108, 112 are not coaxial with one another. Furthermore, in the embodiment described with reference to FIGS. 1-1F, the second fan system 105 is driven by the fluid or gas flow exhausted through the downstream turbine 107 of the first propulsion system 102 and through a second low pressure turbine 111 of the propulsion system 103.

In this form the present invention improves the design of known multiple fan engines, avoiding or greatly reducing all the previously described disadvantages of the aforementioned engine arrangements described in the preamble of this application. Relative to a conventional engine of a given overall bypass ratio the engine of the present invention can halve the total number of turbine stages required to drive the fans, without increasing turbine mean diameter or stage loading or using a gearbox.

Splitter assemblies 116 and 117 are disposed in bypass ducts, 121 and 122 respectively, and enable the flows from the fans 104 and 105 to be discharged through separate, generally coplanar and generally "C" shaped nozzles 123 and 124. The bypass ducts 121 and 122 are defined, radially outwardly by the inner walls of the nacelle 137 and radially inwardly by a core engine casing or fairing 141. Furthermore, during reverse thrust mode of engine 101 operation, air flows from the fans 104 and 105 are directed to pass through thrust reverser doors and/or cascades 125 and 126 on the sides of the engine 101.

Furthermore, although not essential, the bypass duct splitter assemblies 116 and 117 comprise an array of fan outlet guide vanes 703 and 704 that are arranged in a helical pattern. This arrangement of helical outlet guide vanes 703 and 704 is disclosed in the present applicant's earlier UK Patent GB1, 291,235, the teachings of which are incorporated by reference herein, however a brief description, with reference to FIG. 1E, is included hereinafter. The object of the helical outlet guide vanes 703 and 704 is to produce a more uniform pressure field for improved operability of the fan rotors 113, 114, which is particularly necessary for this embodiment as the cross-sectional profile of the bypass ducts changes from a substantially ring-shaped section to a part-ring-shaped section.

Alternatively and/or additionally, a proportion of the flow from the second fan system 105, or flows from both fan systems 104 and 105, may be combined with the final turbine exhaust flow by means of a mixer assembly 127 inside a central afterbody 128, upstream of a final hot nozzle 129. By mixing bypass and core engine flows this arrangement can reduce the hot jet velocity thereby reducing exhaust noise and it enables both of the cold nozzles 123 and 124 to pass the same amount of flow and so be manufactured as common components.

To synchronise the fan rotors 113 and 114 at or above idle speeds, the work split between the two low-pressure turbines 107 and 111 is adjusted by varying the inlet capacity of the second low-pressure turbine 111 using a set of variable pitch vanes 130 positioned upstream of the second turbine 111. Alternatively, synchronisation of the fan rotors 113 and 114 is achieved by varying the flow area of the final hot nozzle 129. This could, for example, be achieved by means of an axially moveable tapered central plug (or centre-body) 131, as disclosed in the present applicant's earlier UK Patent Application GB0205701.6, the teachings of which are incorporated by reference herein.

To control the fan working lines of engines with low fan pressure ratios in order to improve surge margin at low air speeds, when the exhaust nozzles are not choked, the cold flow bypass nozzles 123 and 124 comprise means to vary their area. Such variable area nozzle configurations are known in the art and further discussion is not necessary. Alternatively, one or more variable area auxiliary cold flow nozzles 132 could be incorporated, or one or more of the fan rotors 114 and 115 could be fitted with variable pitch rotor blades. The auxiliary cold flow nozzles 132 may further be integral with a thrust reverser, as known in the art.

Where commonality of parts is preferred for the outlet guide vanes 117, 118, a core flow duct 150 is provided for ducting the "fan core flow" of the second fan rotor 114 to the bypass nozzle 123. The fan core flow duct 150 is configured to partially surround the short duct 110 and to substantially surround the turbine 111, thereby providing a uniform circumferential distribution of fan rotor 114 core flow at the exit of turbine 111. The fan core flow duct 150 is further described with reference to FIGS. 1A, 1B, 1C and 1D.

In FIGS. 1A, 1B, 1C and 1D, the same reference numerals denote the same components as described in relation to FIG. 1. These Figures are intended show the internal engine arrangement.

Figure 1A:
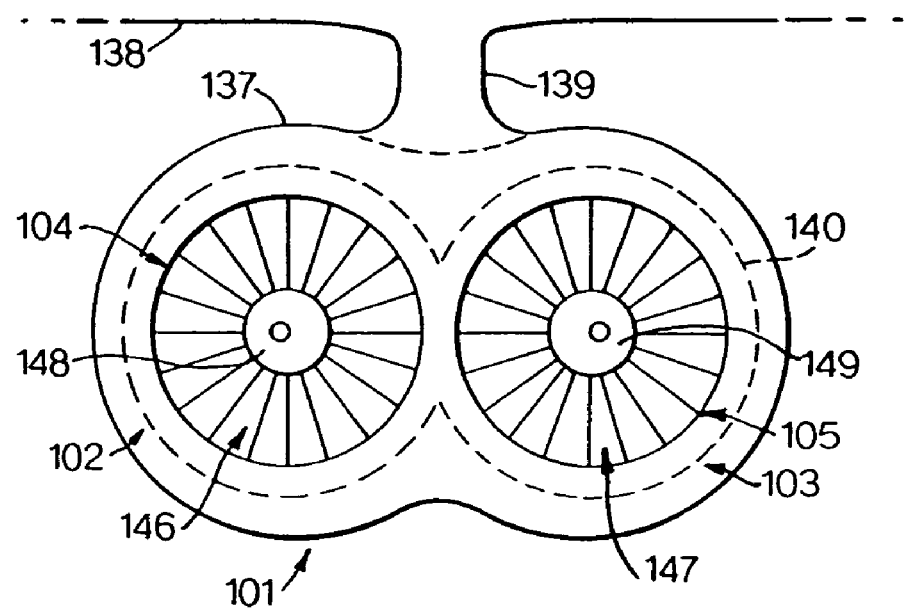
FIG. 1A is a schematic front view on A of the first embodiment shown in FIG. 1.

FIG. 1A shows the turbofan engine 101 supported from a wing 138 of an aircraft via a pylon 139. Other mounting systems should be apparent to one skilled in the art, including fuselage and embedded engine mounts. The integrated nacelle 137 partly defines the separate intake systems 102 and 103, which each substantially surround the fan systems 104 and 105 respectively. Each fan system 104, 105 comprises an annular array of radially extending blades 146, 147 as commonly known. The blades 146, 147 are mounted on a retaining disc (not shown), which is in turn drivingly connected to the shaft 108, 112. A spinner assembly 148, 149 provides an airwash surface that directs the intake air onto the blades 146, 147. The dashed line 140 defines a leading edge 140 of the intake systems 102, 103. The Figure particularly shows the shape of the nacelle 137, the intake systems 102, 103 and the side be side arrangement of the fan systems 104, 105. As can be seen more clearly in FIG. 1, the rotational axis of each fan system 104, 105 is angled from the centre-line 100. Although it is desirable to limit this angle as much as possible, it is an object to configure the intake systems 102, 103 to provide a near uniform air flow onto the fan rotors 113, 114.

Whereas it is preferable for the angle between the shafts 108, 112 to be as acute an angle as possible, thereby allowing the fan rotors 113, 114 to be normal to the direction of airflow thereon, the shafts 108, 112 may be angled between 1-40 degrees relative to one another, and converge in the downstream direction. For most practical applications the shafts 108, 112 are angled between 10-30 degrees relative to one another and in the specific example shown in FIG. 1 an angle of approximately 20 degrees is used.

Figure 1D:
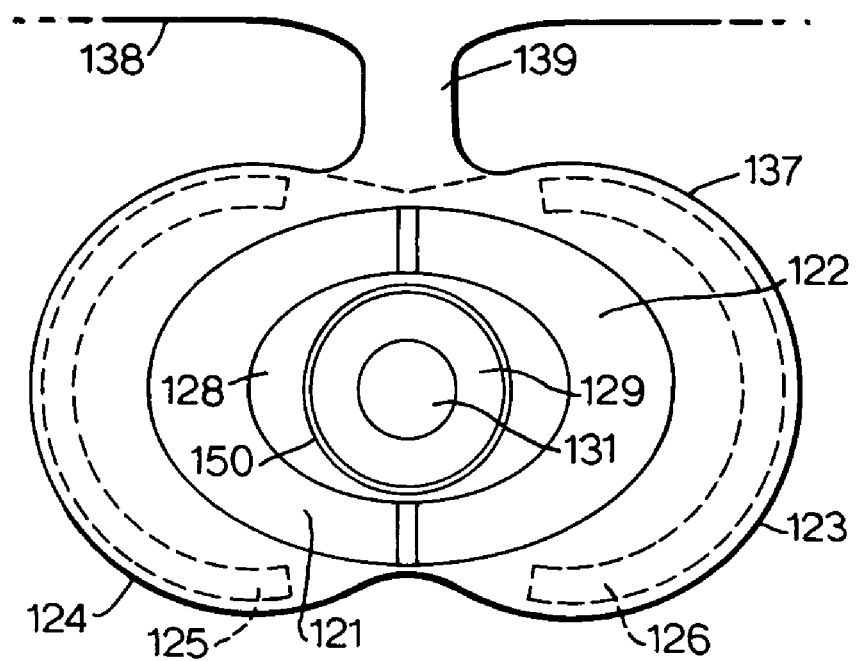
FIG. 1D is a schematic rear view on D of the first embodiment shown in FIG. 1.
Figure 1B:
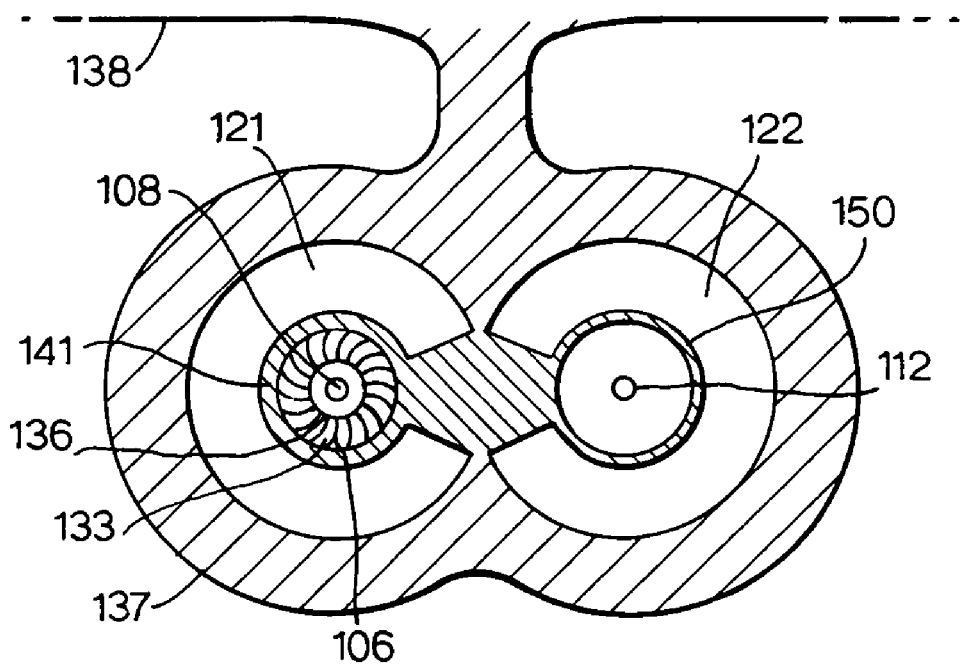
FIG. 1B is a schematic transverse section view on B-B of the first embodiment shown in FIG. 1.

FIG. 1B illustrates the configuration of the bypass ducts 121, 122, defined radially outwardly by the integrated nacelle 137 and radially inwardly by the core engine casing 141 and the core flow duct 150. The core engine casing 141 substantially surrounds the core compressor 133 of the core engine 106. The core compressor 133 comprises an annular array of radially extending blades 151 that are attached to and retained by a conventional disc (not shown). The disc is drivingly attached to the second shaft 136. The second shaft 136 is coaxial with shaft 108.

The section shown in FIG. 1C intersects the rear of the nacelle 137 where the wall of the nacelle 137 thins as well as the nacelle 137 radially converging. The core engine casing 141 also radially converges, although the rate of thinning of the nacelle wall and the relative rates of convergence of the nacelle 137 and core engine casing 141 provide a divergent bypass duct 121, 122. Further downstream towards the nozzle outlet 124, the bypass duct 121, 122 converges. The short duct 110, which carries the high temperature core gasses from the core engine 106 to the second low pressure turbine 111, surrounds both shafts 108 and 112. Both shafts 108 and 112 are protected from the high temperature core gasses by heat shields 142, 143. Core flow duct 150 surrounds part of the short duct 110 although further downstream the core flow duct 150 surrounds a greater portion of the short duct 110.

The forward looking view of the rear of the turbofan engine 101 of FIG. 1D shows the downstream peripheries of the various exhausts described herein before. The integrated nacelle 137 terminates in the downstream bypass nozzles 123 and 124, the nozzles 123 and 124 forming a generally oval shape as shown. However, the nozzle shape may also be elliptical. The bypass ducts 121 and 122 converge and are radially outwardly defined by the bypass nozzles 123, 124. At the downstream periphery, the central afterbody 128 defines the bypass ducts 121 and 122 radially inwardly. The central afterbody 128 also defines the outward portion of the core flow duct 150, while the final hot nozzle 129 is defined between the radially outer core flow duct 150 and the axially moveable tapered central plug 131.

Figure 1F:
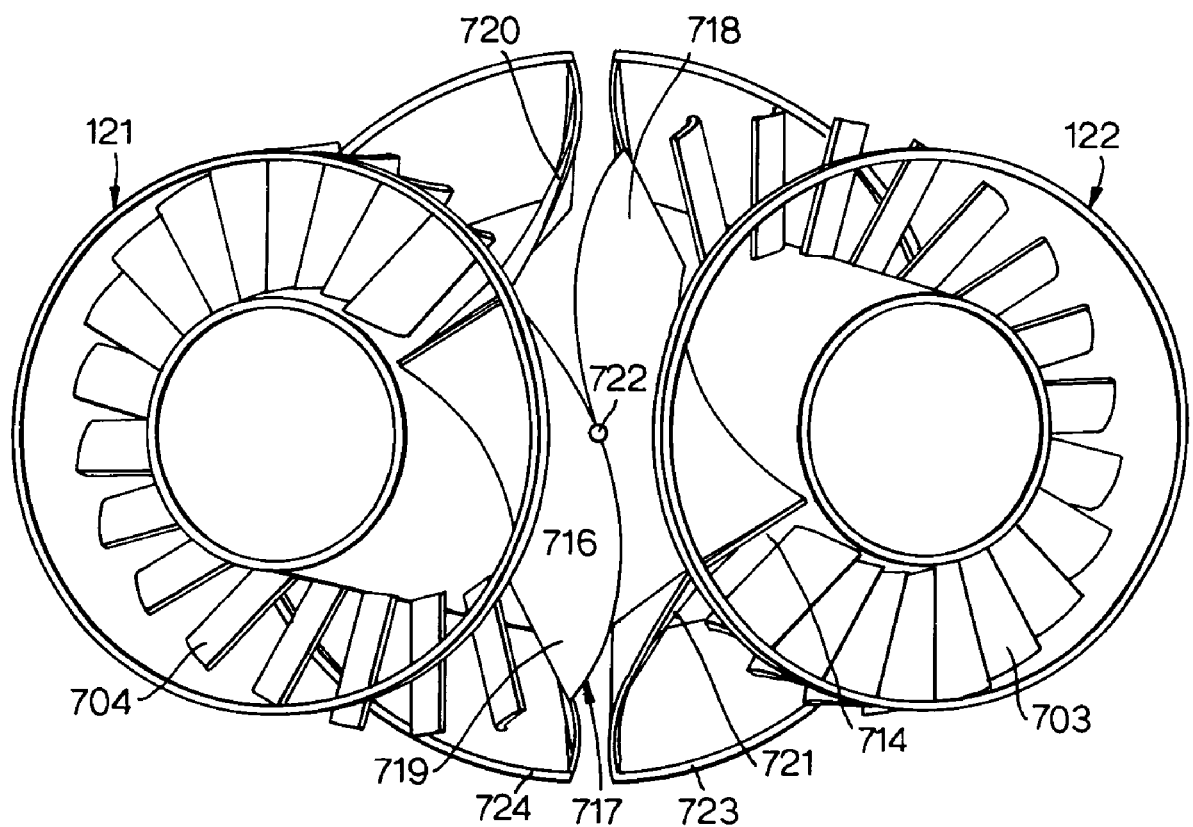
FIG. 1F is a schematic cut away front view of the first embodiment shown in FIG. 1.

Referring now to FIGS. 1E and 1F that show a preferred, but not essential, arrangement for the bypass ducts of the turbofan engine 101, where the two fan rotors (113, 114, which are omitted from FIGS. 1E and 1F) both rotate in the same rotational direction. In this example the fan rotors (113, 114) would rotate clockwise when viewed from the front. This arrangement uses the principle of a helical array of guide vanes as disclosed in GB1,291,235.

The two bypass ducts 121 and 122 each comprise a set of fan outlet guide vanes 703 and 704 disposed in a helical arrangement about respective fan shaft axes 705 and 706.

Each set of vanes 703 and 704 divide the bypass ducts 121 and 122 into forward parts 707 and 708 wherein the airflow substantially retains the fan rotor imparted swirl, and aft parts 702 and 709 wherein the fan rotor imparted swirl is substantially eliminated by the sets of vanes 703 and 704 respectively. The airflow in the bypass ducts 121 and 122 is contained by the walls of the inner annuli 710 and 711 and by the walls of the outer annuli 712 and 713, which are shown with their middle parts cut away for clarity in this figure. Typically, the radii of both the inner and the outer annuli increase towards their aft ends.

The upstream parts of the forward parts 707 and 708 of the bypass ducts 121 and 122 are of substantially circular cross-section, but the flows in the ducts are divided by the leading edges 714 and 715 of bypass duct splitters 716 and 717 so that the remaining parts of the ducts have part circular cross-sections. By the aft ends of the aft parts of the ducts 708 and 709 the duct annuli are part-ring shaped in cross-section.

The side walls of the bypass duct splitters 716 and 717 follow substantially helical paths like those of parts of the flanks of a screw thread. The bypass duct splitter walls 718 and 719 which are in contact with flows that retain most of the fan rotor imparted swirl, are more markedly twisted relative to the fan axes 705 and 706 than the remaining bypass duct splitter wall sections 720 (and 721—see FIG. 1F). The twist on the splitter walls 718 and 719 enables the bypass ducts to be opened out into a part-ring shaped cross-section in a shorter length and with lower pressure losses than would otherwise be possible, and is the main reason for disposing the sets of vanes 703 and 704 in helical arrangements relative to the fan shaft axes 705 and 706.

An optimised aerodynamic design for the bypass ducts of a multiple fan engine typically will include further refinements not shown in the schematic arrangement of FIG. 1E. These may include locally more acutely angled leading edges to the bypass duct splitters, cyclic variation in the camber and/or stagger of the vanes, changes in the radial depth of the bypass duct and other three dimensional design features.

Referring now and more specifically to FIG. 1F, which shows schematically the same arrangement of the bypass ducts as shown in FIG. 1E and viewed from the front of the engine. The two bypass ducts 121 and 122 and the two sets of fan outlet guide vanes 703 and 704 are more clearly shown to be identical or nearly identical assemblies disposed around an axis of rotational symmetry 722 which may also be considered as a centre-line for the overall engine. The leading edges 714 and 715 of the bypass duct splitters 717 and 716 are followed by the more twisted bypass duct splitter walls 718 and 719, and also by the less twisted bypass duct splitter walls 720 and 721. The aft ends 723 and 724 of the two bypass ducts 121 and 122 are brought close together, so that together they form an almost complete, almost circular (or if flattened, a generally elliptical or oval) flow passage.

Figure 2:
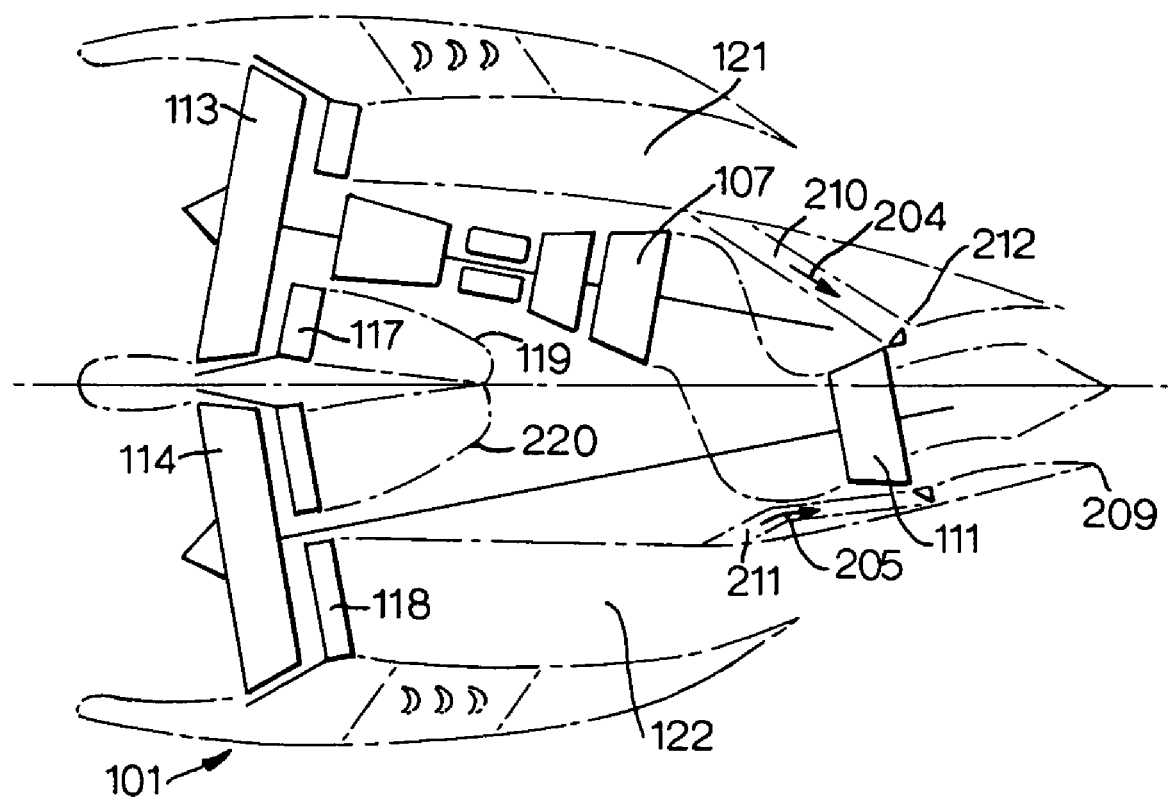
FIG. 2 is a schematic plan view of a second embodiment of a turbofan engine in accordance with the present invention.

FIG. 2 shows a second embodiment of a turbofan engine 201, generally similar in configuration to the turbofan engine 101 described with reference to FIG. 1, except that synchronisation of the speeds of the fan rotors 113 and 114 and controlling the fan working lines at least partly is by means of variable bleed flows 204 and 205 from the two bypass ducts 121 and 122 respectively. These bypass duct bleed flows 204, 205 are exhausted together with the exhaust gasses from the final turbine 111 through a variable area mixed flow exhaust nozzle 209. The bleed flows from bypass ducts 121 and 122 are regulated by means of one or more variable geometry flow off-takes 210 and 211. Alternatively, bleed flows through the off-take ducts 210, 211 are modulated by means of a variable area mixer assembly 212. The variable area mixer assembly 212 is configured to vary the pressure ratio in the exhaust nozzle 209 thereby increasing or decreasing flow through the ducts 210, 211 as required.

It should be appreciated that the two bypass ducts 121 and 122 may alternatively be in fluid communication thereby allowing excess flows from either duct to pass into the other. This enables a more even distribution of the exiting bypass airflow from the nozzles 123, 124.

FIG. 2 also shows an alternative arrangement of the ducting and fan outlet guide vanes 117, 118 to the configuration of the turbofan engine 101 described with reference to FIG. 1. Rather than the core flow duct 150 being provided for ducting the "core flow" of the fan rotor 114 to the exhaust bypass nozzle 123, all flow through the fan rotor 114 is passed through the bypass duct 122. The fan outlet guide vanes 218 are the full radial height of the bypass duct 122. The splitter assembly 220 and the core engine casing 241 are now contoured further radially inwardly to blend to the radially inner extent of the fan outlet guide vanes 218. The advantage of this arrangement is a reduced amount of ducting and in particular core flow duct 150, however, this is at the expense of non-commonality of fan outlet guide vanes 117 and 118.

Figure 3:
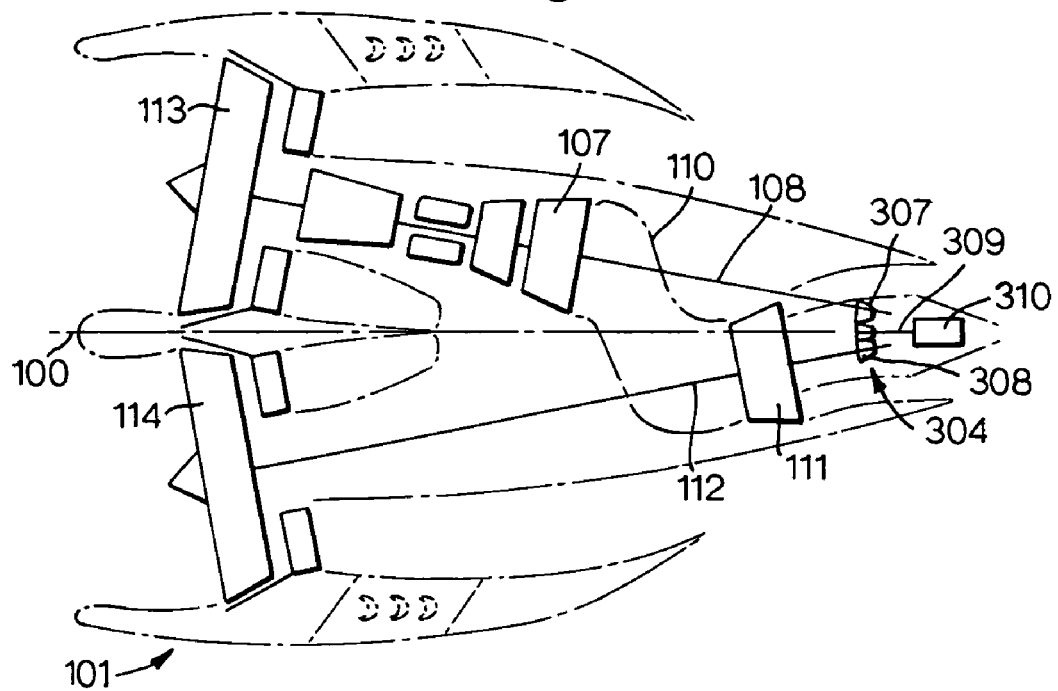
FIG. 3 is a schematic plan view of a third embodiment of a turbofan engine in accordance with the present invention.

Referring to FIG. 3, a third embodiment of a turbofan engine 101 is generally similar to the first embodiment, except that synchronisation of the fan rotors 113 and 114 is without variable geometry, and instead is made by means of a system having a relatively low power gear train 304 configured to work in operative association with the two shaft systems 108 and 112. The object of providing the low power gear train 304 is to transfer power between the first and second fan shafts 108, 112 at least. Where the turbine 111 is provided, the low power gear train 304 is only required to transfer a relatively low amount of power, which is essentially half the difference between power outputs of the turbines 111 and 107, thereby synchronising the fan rotor 113 and 114 speeds. It should be appreciated that this is for a configuration of engine with the fans and booster compressors are of substantially equal sizing. It is possible for the system to comprise more than one low powered gear train 304. A preferred arrangement for synchronising co-rotating fans uses one or two trains of bevel gears 307 and 308 at the turbine ends of each fan shaft 108 and 112, connected via twin bevel gear idlers on lay-shafts 309. Optionally one or more of these lay-shafts may be used to provide an accessory drive 310. The accessory drive 310 is drivingly connected to an electrical generator and is used to power aircraft and engine systems. Alternatively, the accessory drive 310 may be a compressor capable of providing hydraulic fluid or compressed air for use in such aircraft systems as the undercarriage or actuators for the wing flaps.

The present invention is further realised where the turbine 111 is not present and the second propulsion system 103 is driven entirely through the gear train 304, itself driven via the shaft 108 of first propulsion system 102. In this embodiment the duct 110 is not required to be so arcuate although some degree of curvature is required to provide a gas jet that is generally exhausted parallel to the axis 100.

Figure 3A:
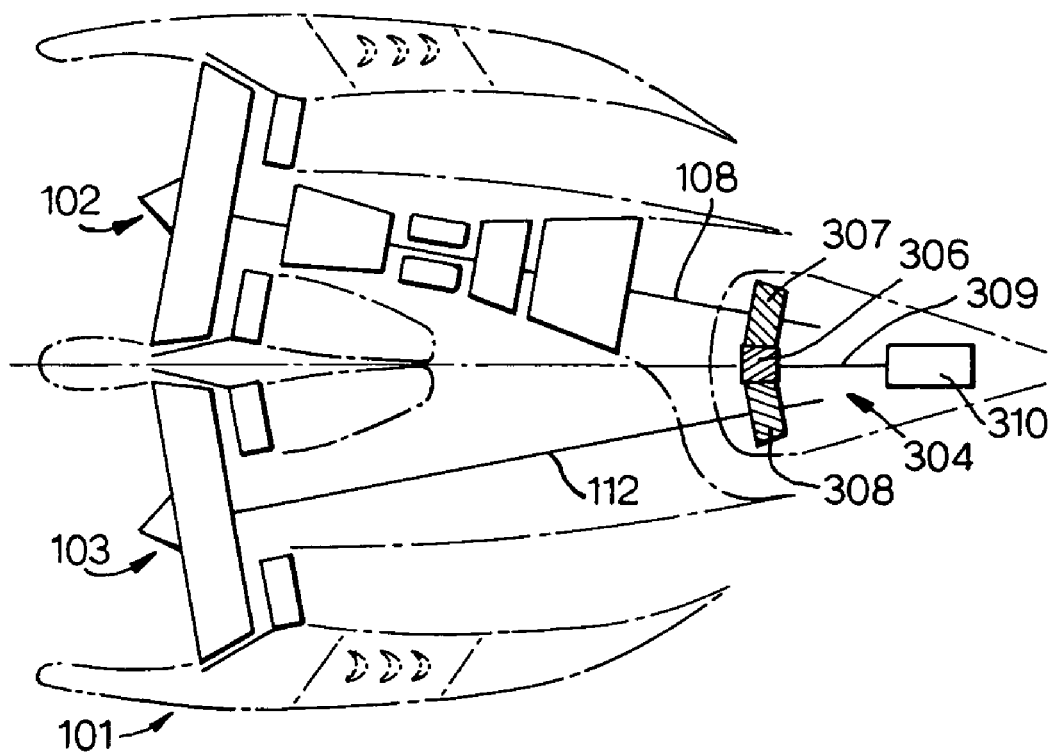
FIG. 3A is a schematic plan view of a generic embodiment of the third embodiment of a turbofan engine in accordance with the present invention.

FIG. 3A shows an embodiment of the present invention in which the low power synchronising gear train 304 is enlarged to transmit all the power required for the second fan 103; the second turbine 111 is therefore omitted. Although the gear train 304 transmits more power and torque than before, nevertheless the power is only half the total engine output power, and the output torque is only $1/\sqrt{8}$, that of an equivalent single fan geared fan engine. Thus the respective gearbox energy losses would also be halved for the multiple fan engine 101 when compared to a single fan engine.

Figure 3B:
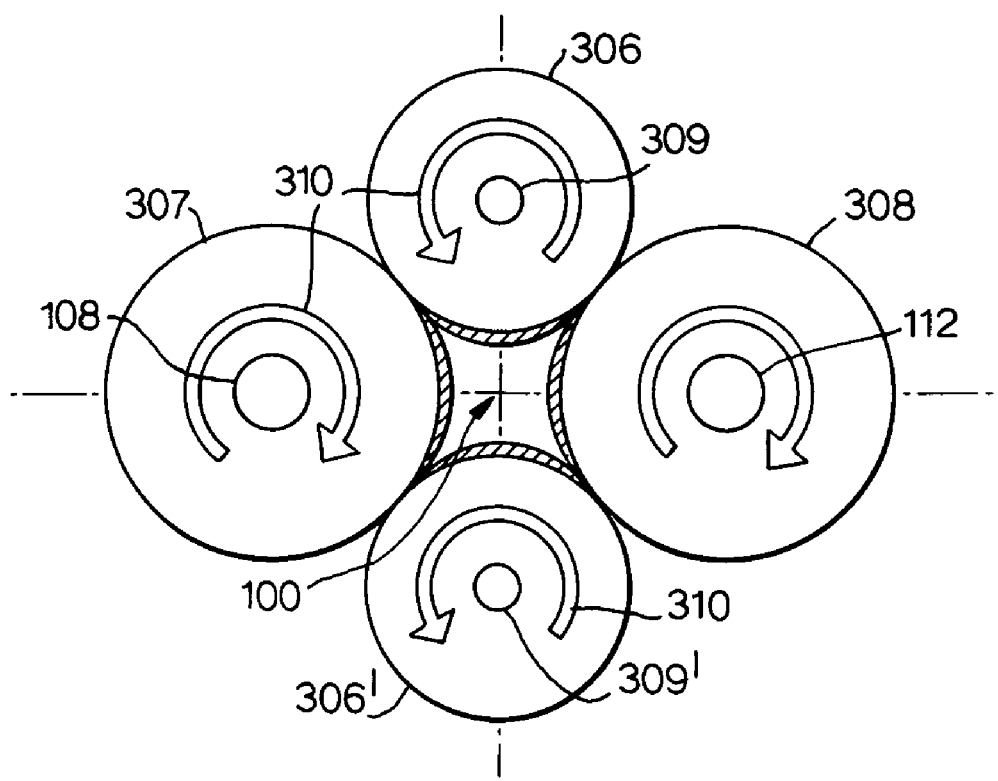
FIG. 3B is a schematic view on the front of a gear train linking co-rotating main-shafts via bevel gears with idler bevel gears on lay-shafts.

The gear-train 304 is shown schematically as two large spiral bevel gears 307, 308 with a single idler spiral bevel gear 306 on a lay-shaft 309, which may optionally drive an accessory unit or units 310. Where it is desired for the main shafts 108, 112 to contra-rotate then the idler gear 306 may be omitted. Alternatively various other gear-train arrangements known in the art may be used to transmit power between the main fan shafts 108, 112, or plain, or V shaped or toothed belt drives or chains may be used. However a preferred arrangement would be to use twin lay-shafts as shown in FIG. 3B. The spiral gearing will generate significant end loads in opposite directions on the two main shaft 108, 112 systems, but by choosing the rotational hand of the spiral this is turned to advantage in balancing out the rearwards thrust load from the turbine and fan on the first fan shaft, and the forwards load from the fan on the second fan shaft.

FIG. 3B shows the gear-train 304 linking co-rotating main fan shafts 108, 112 via bevel gears 307, 308 with idler bevel gears 306 and 306' having respective lay-shafts 309 and 309'. Note details such as gear teeth, shafts and bearings, are not shown for clarity however, those features are intended to be used and are commonly known in the art. It is preferable although not essential that the main-shaft bevel gears 307, 308 are spiral in configuration.

The first main-shaft bevel gear 307 drives the second main-shaft bevel gear 308 via the idler bevel gear 306. Preferably, the axes of rotation of all three or four gears 307, 308, 306, 306' meet at an imaginary point on the engine centreline 100. Alternatively hypoid bevel gears may be used, in which case the axes of rotation of the gears do not all intersect at one point. The arrows 310 show a preferred set of directions of rotation of the gears 307, 308, 306 and 306'.

Figure 4:
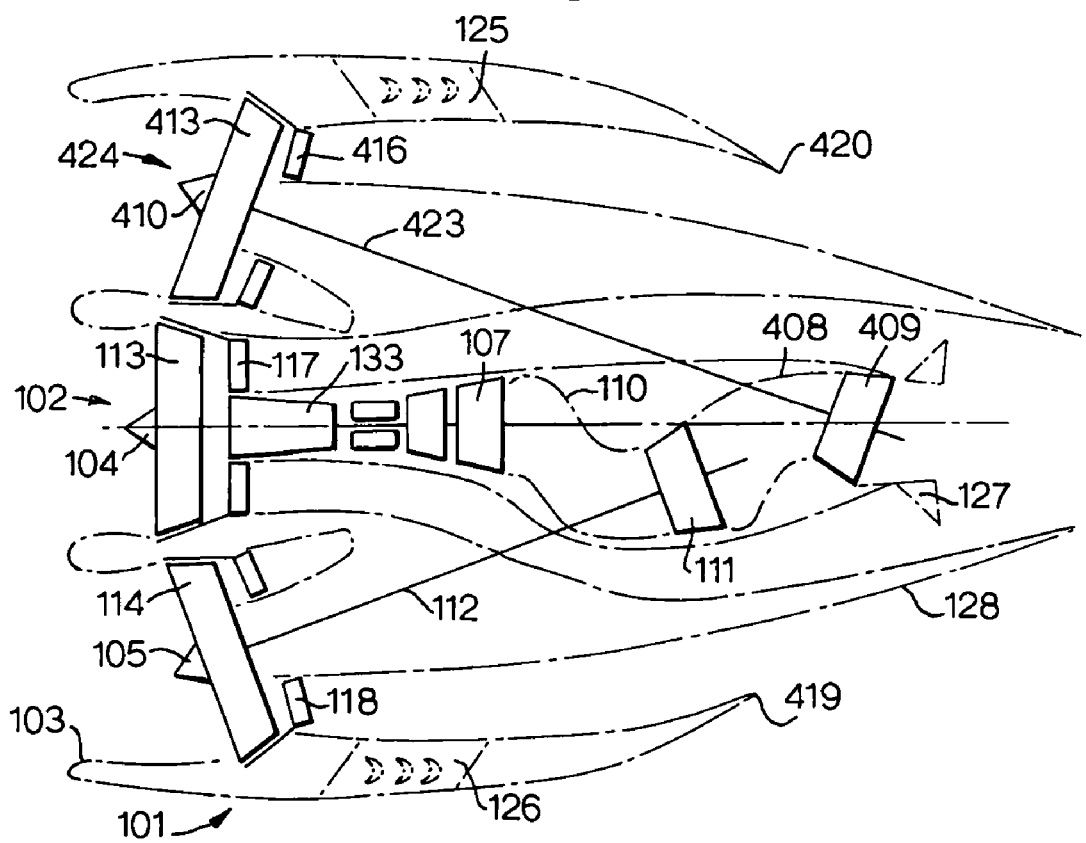
FIG. 4 is a schematic plan view of a fourth embodiment of a turbofan engine in accordance with the present invention.

FIG. 4 illustrates a further embodiment of the turbofan engine 101 of the present invention, which comprises three fans systems 104, 410 and 105. When installed in an aircraft on the ground the fans are generally positioned side-by-side, and is otherwise generally similar to either the first, second or third embodiments. A first fan system 104 has a conventional bypass ratio $\eta_1$, and is followed by a conventional core engine 106 coaxial to the first fan 104 and to a first low pressure turbine 135 which has a "small number of rotor stages", defined hereinafter, and drives the first fan 104 directly. The exhaust gasses from the first low pressure turbine 135 are discharged into a short duct 405 which displaces the flow away from the first low pressure turbine 135 axis. The gasses then enter a second low-pressure turbine 111 that has a direct drive to the second fan 105. The exhaust gasses from the second low-pressure turbine 111 are discharged into another short duct 408 that displaces the flow away from the second turbine axis. The exhaust gasses then enter a third low-pressure turbine 409 that has a direct drive to the third fan 410. The fan rotors 113, 114, 413 each have the same mass flow so that the overall bypass ratio $\eta$ is increased to $(3\eta_1+2)$. For economy, either two or more of the fan rotors 113, 114 and 413 and fan casings 117, 118, 416 are identical. The engine 101 may be arranged with the first fan 104 in the centre with the other two on either side, or the second fan 105, or the third fan 410 may be in the central position. The axes of the fans 104, 105 and 410 need not be parallel or coplanar, and may be arranged to be convergent at the turbine ends to minimise the lengths of the inter-turbine ducts.

The bypass flow from the first fan rotor 113 is mixed with the final turbine exhaust flow by means of a mixer assembly 417 in a central afterbody 418. The flows from the other two fans are discharged through separate, generally coplanar and generally "C" shaped nozzles 124 and 123, or through optional thrust reverser doors or cascades 126 and 125 on either side of the engine 101.

Figure 4:
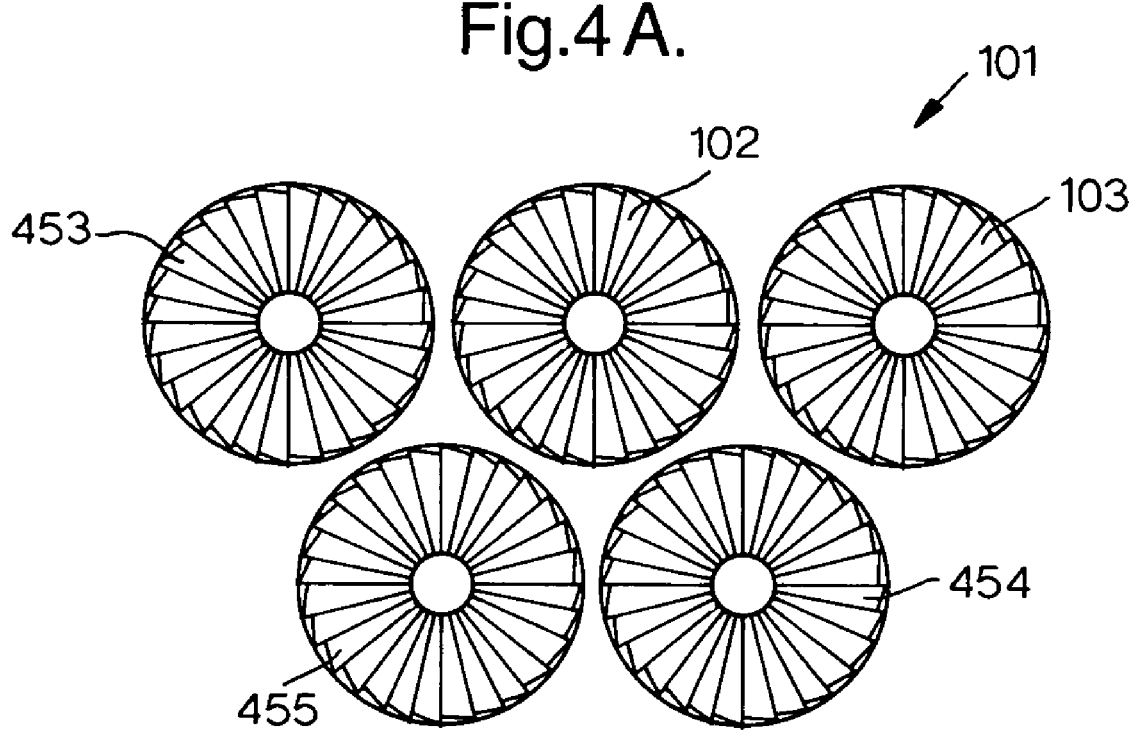
Figure 4B:
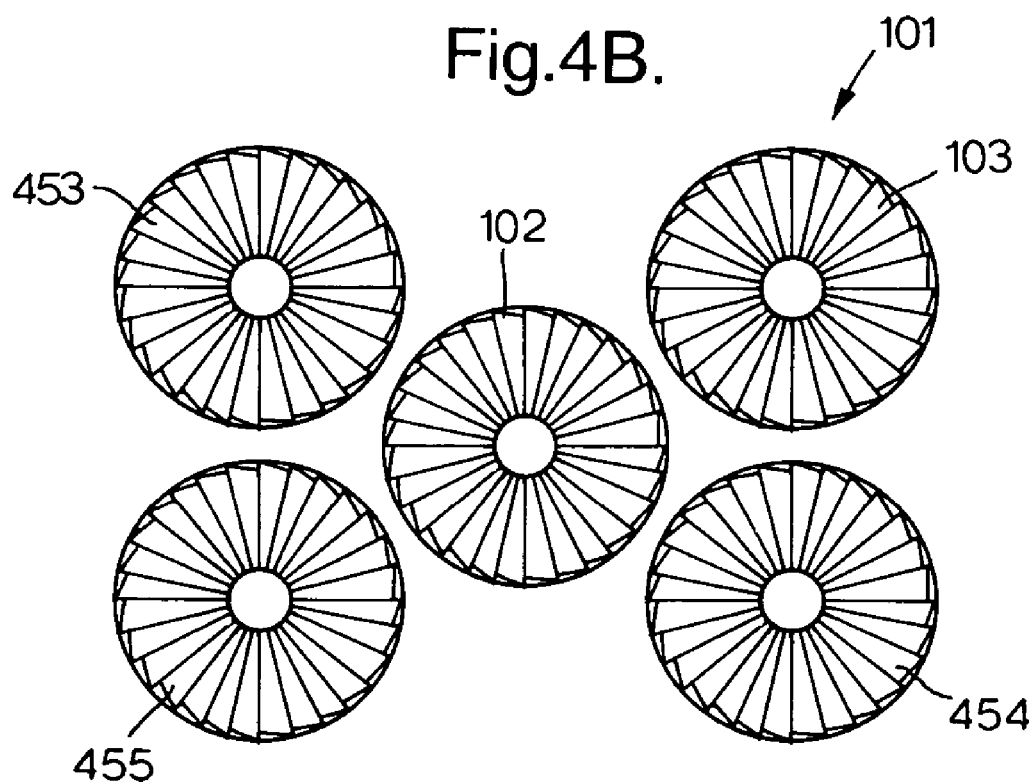

A fifth embodiment of the present invention is easily appreciable and one which would be most appropriate for a very large and very high bypass ratio engine has a cluster of five, approximately coplanar, parallel flow fans 101, 103, 453, 454 and 455, disposed in a "W" or "X" arrangement as shown in FIGS. 4a and 4b. It should be immediately apparent to the skilled artisan that the fans, turbines and shafts of a "W" or "X" arrangement are configured in a generally similar way to those described with reference to FIGS. 3 and 4. A first fan 101 has a low bypass ratio $\eta_1$ and is followed by a conventional core engine coaxial to the first fan and a first low-pressure turbine with a "small number of stages" that drive the first fan 103 directly. The exhaust from the first low pressure turbine is split into two short ducts which displace the flows away from the first low-pressure turbine axis. The exhaust flows from these ducts then enter the approximately coplanar parallel flow second and third low pressure turbines which have direct drives to the second and third fans. The exhaust flows from the second and third low-pressure turbines are discharged into short ducts that displace the flows away from the second and third turbine axes. These flows then enter the approximately coplanar parallel flow fourth and fifth low pressure turbines that have direct drives to the fourth and fifth fans. The exhausts from the fourth and fifth low-pressure turbines are combined in a central afterbody and exhausted through a common nozzle. If the fans each have the same mass flow, the overall bypass ratio $\eta$ is increased to $(5\eta_1+4)$. For economy, some or all of the fan rotors and casings may be identical. The second and third low pressure turbines, and the fourth and fifth low pressure turbines may also be identical. The low pressure turbines and fans may be co-rotating for maximum parts commonality, or contra-rotating for maximum turbine efficiency.

The bypass flow from the first fan is mixed with the turbine exhaust by means of a mixer in a central afterbody. The flows from the remaining fans are discharged through separate, typically coplanar, typically "semi-C" shaped nozzles or part-ring shaped, or through optional thrust reverser doors or cascades on either side of the engine.

A sixth embodiment, otherwise similar to the fifth embodiment, discharges the exhaust from the fourth and fifth low-pressure turbines through separate nozzles.

The principles demonstrated in the first six embodiments can be combined to create further embodiments with other numbers of fans, turbines and exhaust nozzles. Provided that the low-pressure turbine flows are arranged substantially in series, the total number of low-pressure turbine rotor stages and/or blades and vanes can be reduced.

Consider a turbofan engine as described with reference to FIG. 1, with two fans of equal size driven by two axial flow turbines arranged in series, and compare it with a conventional turbofan engine with a single larger fan of the same total mass flow, flow area and hub to tip radius ratio, driven by a single multi-stage turbine. The smaller twin fans will have the same mean blade tangential velocity as the single large fan and $1/\sqrt{2}$ times its diameter, so their rotational speeds will be $\sqrt{2}$ times higher. Let it be assumed that both engines have the same overall performance cycle and efficiency, and that the turbines which drive the fans are designed with the same through-flow axial velocities, mean stage loadings and "solidity" (defined below). A "turbine stage" is defined as one annular array of radially extending rotor blades (or rotor blade row) and a corresponding annular array of radially extending stator blades (or stator blade row). "Mean stage loading" is defined as the ratio of the power extracted per unit of mass flow per rotor blade row divided by the square of the mean rotor blade tangential velocity. "Solidity" is defined as the inverse of the mean space to axial chord ratio for either or both rotor and stator blade rows.

If the twin fan turbofan engine (101) design described herein with reference to FIGS. 1, 2 and 3 has turbines with the same mean radius and the same rotor and stator blade chords as a conventional single fan design, then each turbine stage, driving a fan, will have $\sqrt{2}$ times higher mean blade tangential velocity and produce twice as much work. Since the total amount of work to drive the fans is the same in both cases, only half the total number of turbine stages and blades and vanes is required to drive both the smaller fans of the twin fan design. Each fan of the twin fan design only requires one quarter of the number of turbine stages and blades and vanes, hence the term "small number of rotor stages". This will give a significant cost and weight saving for the twin fan engine, even after allowing for more robust turbine designs to withstand the higher aerofoil (blade or vane) stresses.

Alternatively, if the conventional single fan and twin fan engines have turbines with mean radii proportional to their fan diameters then the turbine mean blade tangential velocities will be the same and there will be no reduction in the total number of turbine stages for the twin fan engine. However there would still be a reduction in the diameters of the turbines, driving the fans, and in the total number of blades and vanes. If the axial chords remain the same, then the number of blades and vanes in each turbine is reduced in proportion to the diameter of the turbines, in the ratio $1/\sqrt{2}$, which is a reduction of about 29%. Conversely, if the blade and vane aspect ratios (based on axial chords) are kept constant, then the blade radial span increases by the ratio of $\sqrt{2}$, proportionate to the increase in blade chord needed to maintain the flow area, and only half the total number of blades and vanes will be required to drive both the smaller fans. Thus again a significant weight and cost saving is achieved.

It should be appreciated by one skilled in the art that the reduced number of turbine stages realised by the present invention, for any given application requirement, may be a compromise incorporating any one or more of the aforementioned embodiments.

The current invention also enables the bore diameters of the engine core components to be reduced, enabling them to be designed for higher rotational speeds, which in turn reduces parts counts, cost and weight.

Consider again the turbofan engine 101 as described with reference to FIG. 1, with two fans of equal size, driven by two turbines arranged in series, and compared with a conventional turbofan having the same total mass flow and performance. In both cases one shaft joins a fan to a turbine and passes through a hole in the center of the core engine. The fan shafts in the twin fan engine each transmit just half the power and rotate at $\sqrt{2}$ times the speed, reducing the torque each transmits by a factor of $\sqrt{8}$. If both shafts are designed for the same peak torsional stress then the diameter of the shaft in the twin fan engine can be reduced by a factor of $\sqrt{2}$, and the core component bore diameters can be similarly reduced.

The magnitude of the reduction in shaft torque and diameter is similar to that achievable in a geared fan engine, but the twin fan engine does not need the cost, weight and complexity of a high power gearbox, and its fan shaft has the additional benefits of lower rotational speed (reducing whirling problems) and lower axial loads (reducing shaft stressing and shaft coupling problems). Geared fan engines also have the additional disadvantage of needing a large oil cooler to extract waste heat from the gearbox.

The multiple fan engine can also be detail designed so that each fan, together with its turbine, can be laterally separated from the other fans and turbines, for easier transportation, particularly by road or by air, where the height and width of very large turbofan engines creates particular problems. This is preferable to having to separate a large fan from the rest of the engine, and exposing bearing chambers to contamination in the field. Multiple fan engine nacelles may also be split up more easily for easier transportation.

The present invention offers additional advantages to aircraft engines incorporating intercoolers or recuperators, or both intercoolers and recuperators.

Optimum intercooled engine designs are known to have higher overall pressure ratios and peak cycle temperatures than conventional Joule cycle turbofan engines, but this results in a smaller high pressure spool for a given engine thrust and fan size, and a higher bypass ratio for a given specific thrust. The design of the small high-pressure spool is compromised by the relatively large diameter of the fan shaft and the engine requires a larger number of low-pressure turbine stages to drive the fan. Both of these difficulties are alleviated by the present invention.

An intercooler, or intercoolers, situated between two or more core compressors requires a certain length of ducting to diffuse the exit flow from one compressor and feed it back in to the next compressor. This would normally increase the overall length of a conventional engine, but this increase in length can be overcome by new arrangements of the turbo machinery made possible by the present invention.

The size and weight of a heat exchanger for a recuperated engine is minimised by locating it up-stream of the final turbine stages, but this arrangement would significantly add to the length of a conventional engine. In an engine configured in accordance with the present invention a recuperator is accommodated up-stream of the final turbine without significantly affecting the engine layout or its overall length.

The integration of intercoolers and recuperators into a conventional aeroengine with turbo machinery disposed around a single axis presents a number of problems, due to the extra length of ducting required to diffuse the exit flow from one compressor and feed it back in to the next compressor. Previously proposed solutions include the use of centrifugal or axi-centrifugal compressors to minimise length, and disposing heat exchangers around the periphery of the core engine. Both of these solutions tend to increase the diameter of the engine, resulting in increased nacelle drag and increased difficulty in mounting the engines under-wing without ground clearance or wing to nacelle gully depth problems.

In a turbofan with multiple fans driven by turbines in series, this increase in length can be overcome by arranging the first compressor in series and coaxial with the first fan and arranging subsequent compressors to be coaxial with another fan or other fans. Alternatively, the gas flows through a downstream compressor and/or through the turbines that drive them are arranged in the opposite direction to the flow through the fans and the first core compressor. Furthermore, the engine can now be configured with a "reverse flow" core. The intercooler or intercoolers may be situated in one or more of the bypass flows or they may be arranged to be coaxial with the intakes of the subsequent core compressors. Distributing the core turbo machinery about two axes increases the available gas path length for an overall powerplant length, enabling the heat exchangers and ducts to be accommodated.

Ideally a recuperator would be positioned up-stream of the last turbine stages in order to benefit from higher hot side gas pressures and temperatures. This would minimise the size and weight of the recuperator, and enable recuperation to be applied effectively to a higher overall pressure ratio engine, resulting in further improved fuel economy. However the need to provide the extra length for a diffuser in the middle of the turbines in a conventional single axis engine makes this unattractive.

The use of intercoolers also tends to reduce core size for a specific thrust, resulting in higher bypass ratios and potentially requiring an excessive number of turbine stages to drive the fan.

All of these problems can be overcome by implementing the heat exchanger cycles in a turbofan engine with multiple fans driven by turbines in series.

Figure 5:
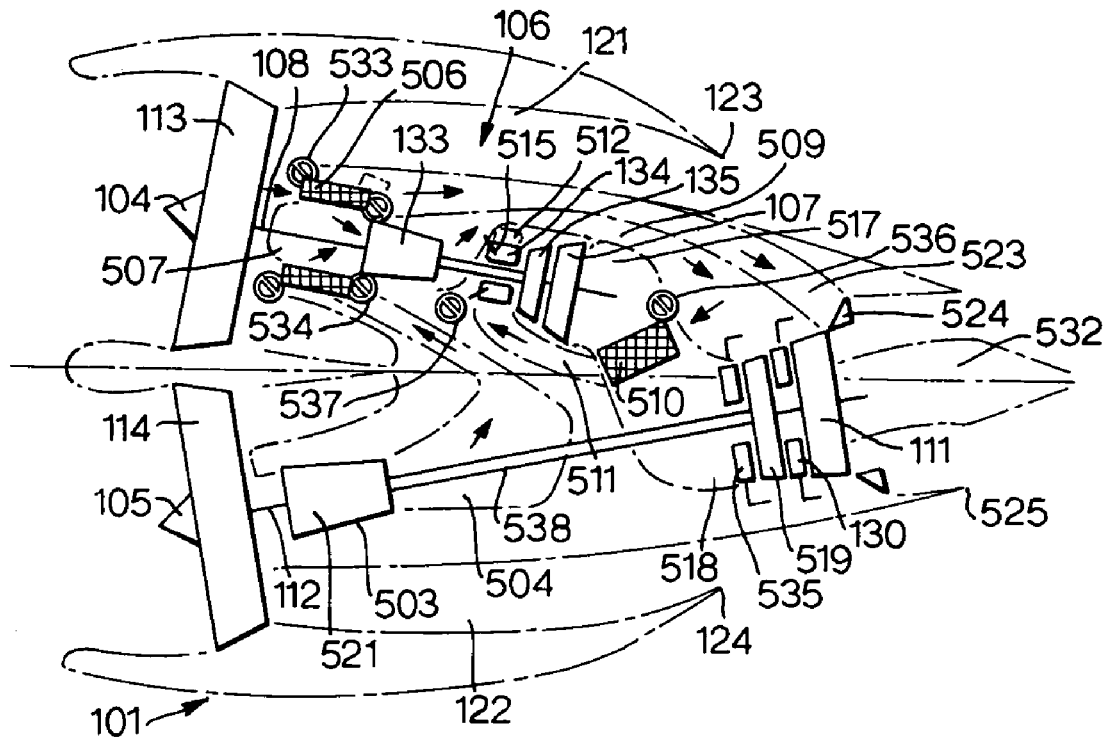
FIG. 5 is a schematic plan view of a fifth embodiment of a turbofan engine in accordance with the present invention.

FIG. 5 shows a seventh embodiment of a low specific thrust turbofan engine 101, otherwise similar to the first, second or third embodiment, but also incorporating heat exchangers to provide an intercooled, or intercooled and recuperated aeroengine design; It takes advantage of the ability to dispose the core engine turbo machinery components about more than one axis, and to position the recuperator up-stream of the last turbine stages without incurring excessive losses or increases in engine length.

The turbofan 101 comprises a first fan 105 and a second fan 104 having fan rotors 114, 113 and axes of rotation 538, 108 respectively. The first fan 105 is followed in downstream flow sequence by a lower pressure compressor 503 and a multi-spool gas generator or core engine 106. The lower pressure compressor 503 is coaxial to the first fan 105. The air exiting the compressor 503 passes into a diffuser duct 504 before it is ducted away from the first fan axis 538 (fourth shaft) towards the axis 108 of the second fan 104. The compressor 503 produces a generally axial flow of compressed air and is followed downstream by an axial flow diffuser 504. Alternatively, the compressor 503 has a centrifugal or mixed flow last stage that exhausts into the diffuser 504, which is in the form of a volute. The air from the diffuser 504 or volute is then fed around an annular intercooler heat exchanger 506 that is generally coaxial with the second fan 104. The compressed air then passes into and through the intercooler 506 where it is cooled by lower pressure air which has passed through the inner section of the second fan 104, before the higher pressure air leaves the intercooler 506 and enters a first chamber 507 upstream of the remainder of the core compression system 133 which is coaxial to the second fan 104. The high-pressure compressor is an axial flow design, but alternatively it may have a centrifugal or mixed flow last stage. By cooling the compressed air, that passes through the intercooler 506 and into the core compression system 133, the core compressor 133 has to do less work on the air to achieve a given pressure ratio. In this way the compressor 133 is designed with fewer stages or alternatively may deliver compressed air with a higher pressure to the combustion system 134.

On exit from the compression system 133 the fully compressed air is diffused and taken by a first conduit 509 to a heat exchanger 510 that acts as a recuperator (510). A second conduit 511 returns the heated air to a second chamber 512 surrounding a combustion system 134 that is coaxial with the core compression system 133 and the high-pressure (hp) turbine system 135 that is downstream of the combustion system 134. Some of the fully compressed air from the compression system 133 may bypass the recuperator 510, and the pipes 509 and 511, and the plenum chamber 512, and pass directly to the cooling air system of the hp turbine system 135. Some of this "unrecuperated" air may also pass directly to the primary zone of the combustion system 134 in order to improve fuel atomisation, to help control emissions, or to cool fuel burners 515 so to avoid fuel decomposition therein.

The exhaust gasses from the hp turbine 135 pass directly to a second turbine 107 that drives the second fan 104. The exhaust gasses then pass from the second turbine 107 into a diffusing duct 517, which is in the form of a bifurcated duct or a set of pipe diffusers, into the hot side of the recuperator 510. From here the gasses pass into a further duct 518 from which the gasses emerge into a fourth turbine 519 coaxial with and driving the lower pressure core compressor 503. The gasses then pass into the final turbine 111 that is coaxial with and drives the first fan 105.

A variable proportion of the high and/or low-pressure flows may also be enabled, by valve means, to bypass the recuperator 510 at high power conditions in order to maximise the power output of the engine 101. Bypassing the recuperator 510 reduces its pressure losses and increases the inlet temperature to the subsequent turbines, increasing the power available for a lower pressure compressor of the core engine 106 compression system.

The first two turbines 135 and 107 run hottest and would normally need cooling, however in this embodiment of the present invention, the later downstream turbines do not need to have cooled aerofoils. Locating the recuperator 510 in the ducts after the first two turbines 135 and 107 offers efficient use of space and provides gas temperatures and pressures which are high enough to enable a compact heat exchanger 510 to transfer enough heat to provide a useful performance benefit. The delivery air pipes or ducts 509 and 511 for the core compressor 133 are also shorter than they would need to be if the recuperator 510 was positioned rearward of the final turbine 111.

The heat exchanger/recuperator 510 is of unitary construction, although in an alternative embodiment the heat exchanger/recuperator 510 is constructed in modules where each module is located in a separate segment of inter-turbine diffusing duct 517 and has its own high pressure feed and return first and second conduits 509 and 511.

The core compression system 133 and the associated turbine system 135 are in the form of a single spool although a multiple spool system is further beneficial.

In another arrangement of this embodiment, a lower pressure core compressor 521 may be coupled to the first fan rotor 114 so that both compressor rotors rotate together and are driven by the single final turbine 111. In this case the fourth turbine 519 is omitted. Where the fourth turbine 519 is included a fourth shaft 538 is coaxial with shaft 112 and is drivingly connected to the lower pressure core compressor 521.

The cooling air that has passed through the intercooler 506 is taken through ducts 523 to a mixer 524 where it is combined with the exhaust from the turbine 111 before the combined exhaust is discharged through the final hot jet nozzle 525. This arrangement enables the pressure ratio of the cooling air to be optimised independently of the pressure of the air in the bypass duct segments 122 and 121 so the intercooler cooling air can be used to reduce the hot jet velocity, thereby reducing exhaust noise and enabling both cold nozzles 124 and 123 to pass the same amount of flow and so be manufactured as common components.

It is desirable, to synchronise the fan rotors 114 and 113 at or above idle speeds, that the work split between the two turbines 107 and 111 can optionally be adjusted by varying the inlet capacity of the last turbine 111 using variable pitch vanes 130.

At low power conditions the inlet capacity of the last turbine 111 would be reduced so that its pressure ratio increases. This enables the speed of the first fan 105 to be matched to the speed of the second fan rotor 114. It also reduces the pressure ratio of the fourth turbine 519 that reduces the pressure ratio of the compressor 503 and can help to prevent this compressor from surging at a part power or transient condition.

An alternative option is to vary the flow area of the final hot nozzle 525. This can, for example, be achieved by means of an axially moveable tapered central plug 532 as hereinbefore described.

The annular arrangement of the intercooler 506 enables the lower pressure air to pass through it by the most direct path, and makes it easy to provide low loss intercooler bypass passages for both flows for an engine with switchable intercooling. That is a high-pressure ratio engine where the intercooler is only used at high power when it is needed to limit peak thermodynamic cycle temperatures. The intercooler may be a combination cross-flow and counter flow design. It could for example be constructed with triple-pass serpentine pipes for the higher pressure flow.

The cold side mass flow through the intercooler may be regulated by having a variable area mixer 524, or by a set of intercooler bypass valves 533, or both. The hot side flow could also bypass the intercooler by means of another set of bypass valves 534. Alternatively, in an intercooler with a triple pass arrangement on the hot side, the hot side pressure losses may be reduced by an arrangement of valves which bypass two of the passes to leave a single pass arrangement. By such means the degree of intercooling may be reduced at high altitudes and part power conditions, in order to improve fuel economy or to reduce thermal shock in the hotter parts of the engine.

The variable capacity variable pitch vanes 130 can also be used to raise the temperature of the recuperator 510 at part power conditions, but in this case alternative means is adopted to synchronise the fan speeds. This alternative means is provided by a stage of variable capacity vanes 535 at inlet to the fourth turbine 519; however, the alternative means may also be provided by a low power gear train such as that described with reference to the third embodiment and FIG. 3.

To increase engine power output, for instance on hot days, local bypass valves 536, 537 disposed on the hot side or the cold side respectively, or both sides simultaneously of the recuperator or recuperators 510, are used, although at the expense of additional fuel use. To increase power it is necessary to bypass the recuperation cycle. This is achieved by opening the bypass valve 537, allowing the compressor flow to flow directly into the combustor 134, and through the turbines 135, 107. Closing the bypass valve 536 bypasses the turbine flow from flowing through the heat exchanger 510. The local bypass valves 536, 537 are also used to help control compressor working lines and fan speeds by increasing or decreasing the non-dimensional flows and hence the work dome by their respective turbines.

The principles demonstrated in the first 6 embodiments may be combined with the principles demonstrated in embodiment number 7, by the skilled artisan, to create further embodiments of intercooled or recuperated or intercooled and recuperated engines with other numbers of fans, turbines and exhaust nozzles.

It is observed, herein, that angling the fan axes so that they tend to converge at their turbine ends results in a more compact turbo machinery layout. However, operating the fans at larger angles of incidence relative to the external free-stream velocity vector places greater demands on the intake system to minimise flow distortions into the fans, so ideally the angle of incidence should be minimised. It should therefore be appreciated by the skilled artisan that a solution to meet both sets of requirements comprises introduction of an angled drive into one or more of the shaft systems between a fan and a turbine.

Figure 6:
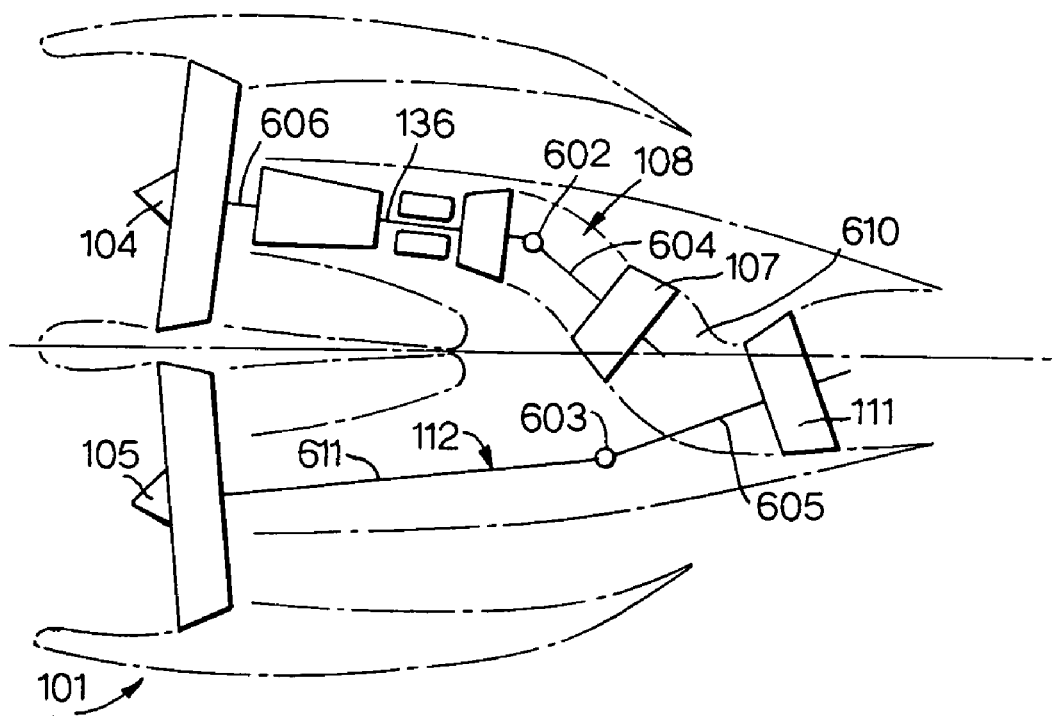
FIG. 6 is a schematic plan view of a sixth embodiment of a turbofan engine in accordance with the present invention.

Referring now to FIG. 6, which shows schematically how the change in angle between the fan axes is achieved. The engine 101 comprises shafts 108 and 112 which respectively incorporate angled drives 602 and 603 between fans 104 and 105 and turbines 107 and 111, in order to bring the turbines 107 and 111 closer together to minimise the length of the inter-turbine duct 610 and to minimise the length of the overall engine 101. The fans 104 and 105 rotate about shafts 108 and 112 wherein it is highly desirable and significantly beneficial that the angle between shafts 108 and 112 is minimised, so to improve the angle of ingress of air into the fans 104 and 105. Shafts 108, 112 comprise a forward portion 606, 611 and rearward portions 604, 605 each respectively joined at angled drives 602, 603. However, the present invention may be realised by only one of the two shafts 108, 112 being angled.

Most of the benefits of the current invention can also be realized in engines where one or more of the parallel flow fans is driven by means of a mechanical power transmission system from a turbine which is integral with or coaxial with another shaft system.

The mechanical power transmission system may also be replaced by a system using fluidic or electrical power. In this case one, some, or all but one, of the parallel flow fans can be mounted in additional separate nacelles or located remotely on the airframe where they can be used for wake neutralisation, vortex reduction, or boundary layer control, as well as for propulsion.

An engine designed to provide power to remote propulsion devices will benefit from a smaller primary fan for a given specific thrust and overall thrust capability. Even after allowing for the power off-take from a shared power turbine or from a separate free power turbine, the resulting lower bypass ratio of the primary fan will result in a higher rotational speed and fewer turbine blades and vanes and/or a smaller number of turbine stages overall. Such an engine could for example use a super-conducting electrical power transmission system to transmit a significant proportion of its propulsive power to remote locations on the airframe and thereby improving overall propulsive efficiency.

A further advantage of the present invention is that the aspect ratio of the engine is preferably greater (approximately 2:1) than that of a conventional single fan engine (approximately 1:1) of the same power output. This increased aspect ratio (width to height) enables the engine to be conveniently installed within a wing of an aircraft or a "Blended Wing Body" aircraft. Alternatively, the twin fan engine of the present invention could replace two conventional single fan engines, such that a four engined aircraft might be re-designed or re-engined with just two twin fan engines, giving a significant cost saving. In such embedded installations, multiple fan engines may be equipped with separate "two dimensional" or approximately rectangular section final nozzles for each fan. Advantageously, the intakes for each fan would be arranged in line along the wing or blended wing body leading edges, and the nozzles arranged in line along the wing or blended wing body trailing edges, thereby significantly improving the aerodynamics of the whole aircraft.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A bypass turbofan engine comprising:
a first propulsion system comprising a first fan rotor, a core engine, a first low pressure turbine and a first fan shaft drivingly connecting the first turbine and the first fan rotor;
a second propulsion system comprising a second fan rotor drivingly connected to a second low pressure turbine via a second fan shaft, wherein in use a fluid drivingly flows through the first turbine then the second turbine, and wherein the first and second shafts are not coaxial with one another; and
a heat exchanger positioned between the first low pressure turbine and the second low pressure turbine, wherein said engine further comprising a compressor, a combustor and a valve, and wherein the heat exchanger is constructed and arranged to receive an airflow from the compressor such that the airflow may selectively be passed into the combustor by the valve.

2. A bypass turbofan engine as claimed in claim 1 wherein the core engine comprises, in flow sequence, a core compressor, a combustor and a core turbine, the core compressor is drivingly connected to the core turbine via the first fan shaft or a core shaft which is coaxial with the first fan shaft.

3. A bypass turbofan engine as claimed in claim 2 wherein the engine comprises a third propulsion system, the third propulsion system comprises a third fan drivingly connected to a third turbine via a third shaft, the third turbine is arranged substantially in flow sequence with the first and second turbines and the third shaft is not coaxial with a shaft of another fan system, characterised in that the turbines are arranged substantially in flow sequence in order first, second and third turbines.

4. A bypass turbofan engine as claimed in claim 1 wherein the first propulsion system comprises a core flow booster compressor is provided between the first fan rotor and the core engine and is drivingly connected to the first turbine by the first shaft.

5. A bypass turbofan engine as claimed in claim 1 wherein the second fan system further comprises a second compressor, a fourth turbine and a fourth shaft, the fourth shaft is coaxial with the second shaft and drivingly connects the second compressor and the fourth turbine.

6. A bypass turbofan engine as claimed in claim 5 wherein fluid flow from the core engine flows drivingly through the fourth turbine of the second fan system.

7. A bypass turbofan engine as claimed in claim 1 wherein the first and second shafts are angled between 0-40 degrees relative to one another so that the first and second shafts converge in the downstream direction.

8. A bypass turbofan engine as claimed in claim 1 wherein the first and second shafts are angled between 10-30 degrees relative to one another so that the first and second shafts converge in the downstream direction.

9. A bypass turbofan engine as claimed in claim 1 wherein the first and second shafts are angled at approximately 20 degrees relative to one another.

10. A bypass turbofan engine as claimed in claim 1 wherein the rotational speeds of at least two fans are synchronised over at least part of the fans' speed range by means of at least one variable capacity turbine.

11. A bypass turbofan engine as claimed in claim 10 wherein the means of bleeding air from at least one bypass duct comprises at least one variable area auxiliary bypass flow nozzle.

12. A bypass turbofan engine as claimed in claim 1 wherein the rotational speeds of at least two fans are synchronised over at least part of the fans' speed range by means of a variable area core flow nozzle.

13. A bypass turbofan engine as claimed in claim 1 wherein the rotational speeds of at least two fans can be synchronised over at least part of the fans' speed range by means of at least one variable area bypass flow nozzle.

14. A bypass turbofan engine as claimed in claim 1 wherein the rotational speeds of at least two fans can be synchronised over at least part of the fans' speed range by means for bleeding air from at least one bypass duct.

15. A bypass turbofan engine as claimed in claim 1 wherein the rotational speeds of at least two fans can be synchronised over at least part of the fans' speed range by means of a variable area mixer, the variable area mixer is disposed upstream of the core nozzle and in operation mixes part of the bypass air from at least one of the fans with the exhaust flow from the final downstream turbine.

16. A bypass turbofan engine as claimed in claim 15 wherein the rotational speeds of the at least two fan rotors are synchronised by the gear-train.

17. A bypass turbofan engine as claimed in claim 1 wherein the rotational speeds of at least two fans are synchronised over at least part of the speed range of the fans by means of at least one set of variable pitch vanes.

18. A bypass turbofan engine as claimed in claim 17 wherein the at least one set of variable pitch vanes is disposed upstream of the final downstream turbine.

19. A bypass turbofan engine as claimed in claim 1 wherein the second fan system is also driven by the first fan system by means of a gear-train configured to work in operative association with at least two shafts.

20. A bypass turbofan engine as claimed in claim 19 wherein at least one lay-shaft is drivingly connected at one end to the low power gear-train via an idler gear, the at least one lay-shaft is drivingly connected at its distal end to an accessory drive, which is any one from the group comprising an electrical generator or a compressor.

21. A bypass turbofan engine as claimed in claim 1 wherein the engine comprises a nacelle defining a bypass duct, the bypass duct comprises an inlet and a bypass exhaust nozzle, the bypass duct substantially surrounds and extends downstream of a fan rotor and transitions from a substantially circular cross-section to a part-ring shaped cross-section at its exhaust nozzle.

22. A bypass turbofan engine as claimed in claim 21 wherein the part-ring shaped cross-section is in the form of any one from the group comprising a lens, a horseshoe, a semicircle, a semi-elliptical or a super-ellipse shaped engine exhaust nozzle.

23. A bypass turbofan engine as claimed in claim 21 wherein the bypass duct is partly defined by pairs of bypass duct splitter walls that diverge generally in the axial downstream direction from a common leading edge, the divergence of the splitter walls defines the transition of the bypass duct from the substantially circular cross-section to an arcuate cross-section at its exhaust nozzle.

24. A bypass turbofan engine as claimed in claim 23 wherein the bypass duct comprises a set of axially staggered vanes disposed between the divergent splitter walls such that swirling air flow from the fan rotors along the splitter walls and through the bypass duct substantially retains the swirl from the fan rotors until the swirl is reduced by the set of stator vanes.

25. A bypass turbofan engine comprising:
a first propulsion system comprising a first fan rotor, a core engine, a first low pressure turbine and a first fan shaft drivingly connecting the first turbine and the first fan rotor;
a second propulsion system comprising a second fan rotor drivingly connected to a second low pressure turbine via a second fan shaft, wherein in use a fluid drivingly flows through the first turbine then the second turbine, and wherein the first and second shafts are not coaxial with one another;
a heat exchanger positioned between the first low pressure turbine and the second low pressure turbine; and
the core engine comprises, in flow sequence, a core compressor, a combustor and a core turbine, the core compressor is drivingly connected to the core turbine via the first fan shaft or a core shaft which is coaxial with the first fan shaft, wherein the engine is arranged so that the airflow from the core compressor flows through the heat exchanger and into the combustor, the fluid flow from the combustor drivingly flows through the core turbine, the first turbine and the heat exchanger thereby increasing the heat of the airflow from the core compressor to the combustor.

26. A bypass turbofan engine comprising:
a first propulsion system comprising a first fan rotor, a core engine, a first low pressure turbine and a first fan shaft drivingly connecting the first turbine and the first fan rotor;
a second propulsion system comprising a second fan rotor drivingly connected to a second low pressure turbine via a second fan shaft, wherein in use a fluid drivingly flows through the first turbine then the second turbine, and wherein the first and second shafts are not coaxial with one another;
a heat exchanger positioned between the first low pressure turbine and the second low pressure turbine; and
the core engine comprises, in flow sequence, a core compressor, a combustor and a core turbine, the core compressor is drivingly connected to the core turbine via the first fan shaft or a core shaft which is coaxial with the first fan shaft, wherein a first valve is located upstream and adjacent the heat exchanger and a second valve is located between the core compressor and the combustor, the valves are operable to divert the compressor flow around the heat exchanger so that, in use, a desirable increase in engine power is achieved.

27. A bypass turbofan engine comprising:
a first propulsion system comprising a first fan rotor, a core engine, a first low pressure turbine and a first fan shaft drivingly connecting the first turbine and the first fan rotor;
a second propulsion system comprising a second fan rotor drivingly connected to a second low pressure turbine via a second fan shaft, wherein in use a fluid drivingly flows through the first turbine then the second turbine, and wherein the first and second shafts are not coaxial with one another;
a heat exchanger positioned between the first low pressure turbine and the second low pressure turbine;
the core engine comprises, in flow sequence, a core compressor, a combustor and a core turbine, the core compressor is drivingly connected to the core turbine via the first fan shaft or a core shaft which is coaxial with the first fan shaft; and
a first chamber and a second heat exchanger, the first chamber is located between and is in fluid communication with the first fan and the core compressor, the second heat exchanger is adjacent the first chamber and is arranged to receive fluid from the second compressor through the heat exchanger, and during operation cooling fluid from the first fan passes through the heat exchanger to cool the fluid from the second compressor so that the core compressor compresses the fluid more efficiently.

28. A bypass turbofan engine as claimed in claim 27 wherein the second heat exchanger comprises valves, operable to open and close the second heat exchanger to fluid flows from the first fan and the second compressor so that, in use, a desirable increase in engine power is achieved when the valves are closed and the engine is more efficient when the valves are open.

29. A bypass turbofan engine as claimed in claim 28 wherein the valves are operable to regulate the flow of fluid through the second heat exchanger to optimize efficiency at a desired engine output.

30. A bypass turbofan engine as claimed in claim 27 wherein the fluid passing through the heat exchanger from the first fan is ducted to and mixed with a fluid flow exhausting from the second low pressure turbine and upstream of the final nozzle.

* * * * *